US007070093B2

(12) United States Patent

Siemens et al.

(10) Patent No.: US 7,070,093 B2

(45) Date of Patent: Jul. 4, 2006

(54) DEPOSIT TAKING SYSTEM AND METHOD

(75) Inventors: John Siemens, Kleinberg (CA); Nigel Scotland, Bolton (CA)

(73) Assignee: Namsys Inc., Bolton (CA)

( * ) Notice: Subject to any disclaimer, the term of this patent is extended or adjusted under 35 U.S.C. 154(b) by 0 days.

(21) Appl. No.: 10/772,489

(22) Filed: Feb. 5, 2004

(65) Prior Publication Data

US 2004/0226493 A1 Nov. 18, 2004

(30) Foreign Application Priority Data

Feb. 7, 2003 (CA) .................................... 2418663

(51) Int. Cl.
*G06Q 40/00* (2006.01)

(52) U.S. Cl. .......................................... 235/379; 902/9

(58) Field of Classification Search ................ 235/379, 235/380, 382, 385, 383, 375; 209/534; 902/8–16; 705/39–45; 232/4 R; 109/53, 55, 56, 24.1, 109/57
See application file for complete search history.

(56) References Cited

U.S. PATENT DOCUMENTS

| | | | | |
|---|---|---|---|---|
| 2,312,275 | A | 2/1943 | Von Ohlsen et al. | 322/16 |
| 3,897,901 | A * | 8/1975 | Grosswiller et al. | 109/24.1 |
| 3,956,615 | A * | 5/1976 | Anderson et al. | 705/72 |
| 4,166,945 | A * | 9/1979 | Inoyama et al. | 235/379 |
| 4,253,016 | A * | 2/1981 | Hirose | 235/381 |
| 5,538,122 | A | 7/1996 | Siemens | 194/207 |
| 5,561,281 | A * | 10/1996 | Eda et al. | 235/379 |
| 6,000,555 | A * | 12/1999 | Anma | 209/534 |
| 6,012,048 | A * | 1/2000 | Gustin et al. | 705/39 |
| 6,145,737 | A * | 11/2000 | Imai et al. | 232/1 D |
| 6,276,602 | B1 * | 8/2001 | Henderson et al. | 235/379 |
| 6,516,998 | B1 * | 2/2003 | Calder et al. | 235/381 |
| 6,626,357 | B1 * | 9/2003 | Ross | 235/379 |
| 6,659,340 | B1 * | 12/2003 | Siemens | 235/379 |
| 6,663,001 | B1 * | 12/2003 | Suttie et al. | 235/379 |
| 6,749,053 | B1 * | 6/2004 | Ikuta | 194/206 |
| 6,783,061 | B1 * | 8/2004 | Graef et al. | 235/379 |
| 2001/0054643 | A1 * | 12/2001 | Siemens | 235/379 |
| 2002/0035515 | A1 * | 3/2002 | Moreno | 705/26 |
| 2002/0065775 | A1 * | 5/2002 | Managhan | 705/43 |
| 2002/0074393 | A1 * | 6/2002 | Anderson et al. | 235/379 |
| 2002/0100399 | A1 * | 8/2002 | Young | 109/24.1 |
| 2004/0083175 | A1 * | 4/2004 | Bellucci | 705/43 |
| 2004/0099726 | A1 * | 5/2004 | Magee et al. | 235/379 |
| 2004/0173671 | A1 * | 9/2004 | Ferraro | 235/379 |
| 2004/0210515 | A1 * | 10/2004 | Hughes | 705/39 |
| 2004/0217162 | A1 * | 11/2004 | Chigira et al. | 235/379 |
| 2004/0226493 | A1 * | 11/2004 | Siemens et al. | 109/53 |

FOREIGN PATENT DOCUMENTS

| | | | |
|---|---|---|---|
| CA | 2312275 | | 12/2001 |
| JP | 356063664 | * | 5/1981 |

* cited by examiner

*Primary Examiner*—Daniel Walsh
(74) *Attorney, Agent, or Firm*—Vidas, Arrett & Steinkraus P.A.

(57) ABSTRACT

A modular deposit taking system having modules for a user interface associated with a local processor to permit deposit details to be communicated to the system and at least two modular safes, each with a deposit opening and an access door. The deposit openings are processor controlled and upon the user indicating a deposit one or other of the deposit openings are opened to sort user deposits. A remote network computer may be connected to the local processor.

11 Claims, 2 Drawing Sheets

DEPOSIT TAKING SYSTEM AND METHOD

FIELD OF THE INVENTION

This invention relates to the general field of cash management equipment, and more particularly to equipment for taking deposits and methods of using such equipment.

BACKGROUND OF THE INVENTION

Paper currency or cash is still extensively used in supermarkets, restaurants and other high volume retail stores in malls, for example. However, from a retailer's point of view the use of cash can present problems associated with security and efficient handling.

One procedure is to permit cash collected in the course of a business day to be put in a secure local storage device such as a deposit safe. Safes are well known devices for storing valuables that generally comprise a reinforced container made from a strong steel or concrete, and having a door with internal or heavily reinforced hinges. The stored cash may then be retrieved from the safe periodically by security personnel, such as armed security guards, and taken away.

This procedure has several problems. For example, the security guards may not arrive to retrieve the deposits until the next day, or even later. Thus there can be a delay between receiving the payments and getting credit for the same, since the payments may not arrive at the bank until a day or two after it is received from the customer. The delay may be even longer if the armoured vehicle picks up various loads from various deposits from different institutions. This could impose yet a further intervening step of unloading the deposits at a central site, sorting according to eventual destination, and re-loading onto another truck for delivery to a financial institution.

This unknown float while the payments are in transit has several negative aspects including that there is a loss of float interest by the owner. Since the payments have not been credited, they are also not available to help fund current operations. Further, the funds represented by this cash-in-transit may not be accurately known to the owner, thereby compromising the owner's ability to maintain tight financial controls.

Yet another issue is that a given retailer may be receiving various forms of payment, including payments by cheques or the like. These are typically bundled together with the cash and not separated until the acceptance checking at the financial institution. The mixing of cash and cheques can delay processing.

Some of these issues have been partly addressed in the prior art. For example, U.S. Pat. No. 5,538,122, discloses a currency receiving device comprising a safe with an attached currency counter and having a currency receiving opening with a retractable cover, to selectively provide access to the interior of the safe. Cash placed for deposit is counted and then passed from the currency counter to the safe through the currency receiving opening. The patent further teaches a removable currency receptacle made of heavy gauge steel, placed in the safe, to receive the currency.

This patent teaches a device that may enable regular cash deposits to be made into the safe while the main access door is kept closed and locked. The removable receptacle is a more convenient and secure enclosure to use to transport cash from the safe to the bank depository. However, this solution is limited to cash only situations and does not accommodate mixed cash and cheque receipts.

A more recent Canadian patent application 2,312,275 teaches a single currency receiving device which differentiates between cash and cheques. In this device a separate safe for each of cash and cheques built into the housing for the unit. The cash is counted as it is placed in the unit, to provide instant credit to the customer. The device includes a user interface, so the user can communicate deposit information such as the value of a cheque deposit, and includes a connection to a remote computer which will permit a bank, for example, to give instant credit to the customer for the amount of the cash or cheque deposit. An identifier is used on the cash receptacle to permit the receptacle to be tracked through the financial system. Thus, the receptacle is identified upon being placed in the device and its removal is also recorded and tracked electronically.

However, while this device works well in some situations it has certain limitations. For example, the cheques are dropped into the cheque safe through an open throat, which is not the most secure configuration. Further, the combination of having two safes (one for cash and one for cheques) in a single housing incorporating the user interface as well, is too limiting. What is desired therefore is a more flexible equipment design which is more secure and which can be easily adapted to different configurations to suit various transaction volumes or customer demand.

SUMMARY OF THE INVENTION

What is required is a deposit receiving device and method which overcomes the limitations of the prior devices. Most particularly, this device should include a facility for receiving cash deposits and other deposits such as cheques and yet be selectively configurable to facilitate the needs of users. Such a device should securely receive deposits and yet be easy to use and flexible.

Therefore according to the present invention there is provided a deposit taking system for receiving deposits from one or more users, said deposit taking system comprising:

at least two safes each having a lockable access opening and a processor controlled deposit opening;

a local processor, operatively connected to each of said safes, said local processor having a user interface to communicate with the user, and being capable of communicating with a remote processor; and a means for opening a respective one of said processor controlled deposit openings in response to a communication from either said user or said remote processor;

wherein, said user's deposits are sorted by said deposit taking system opening one or another of said deposit openings.

What is also desired is a method of taking deposits which takes advantage of this new deposit taking system.

Accordingly, there is provided a method of taking deposits comprising:

providing a receiving device, comprising at least two safes, a local processor operatively connected to each of said safes, said local processor having a user interface to communicate with a user, each of said safes further including at least a processor controlled deposit opening;

receiving deposit information from said user through said user interface; and opening one of said processor controlled deposit openings to permit the user to place a deposit therein, wherein said user, by placing said deposit in said open processor controlled deposit opening sorts said deposit.

BRIEF DESCRIPTION OF THE DRAWINGS

Reference will now be made, by way of example only, to preferred embodiments of the invention as illustrated in the attached figures.

DETAILED DESCRIPTION OF THE PREFERRED EMBODIMENTS

Figure 1:
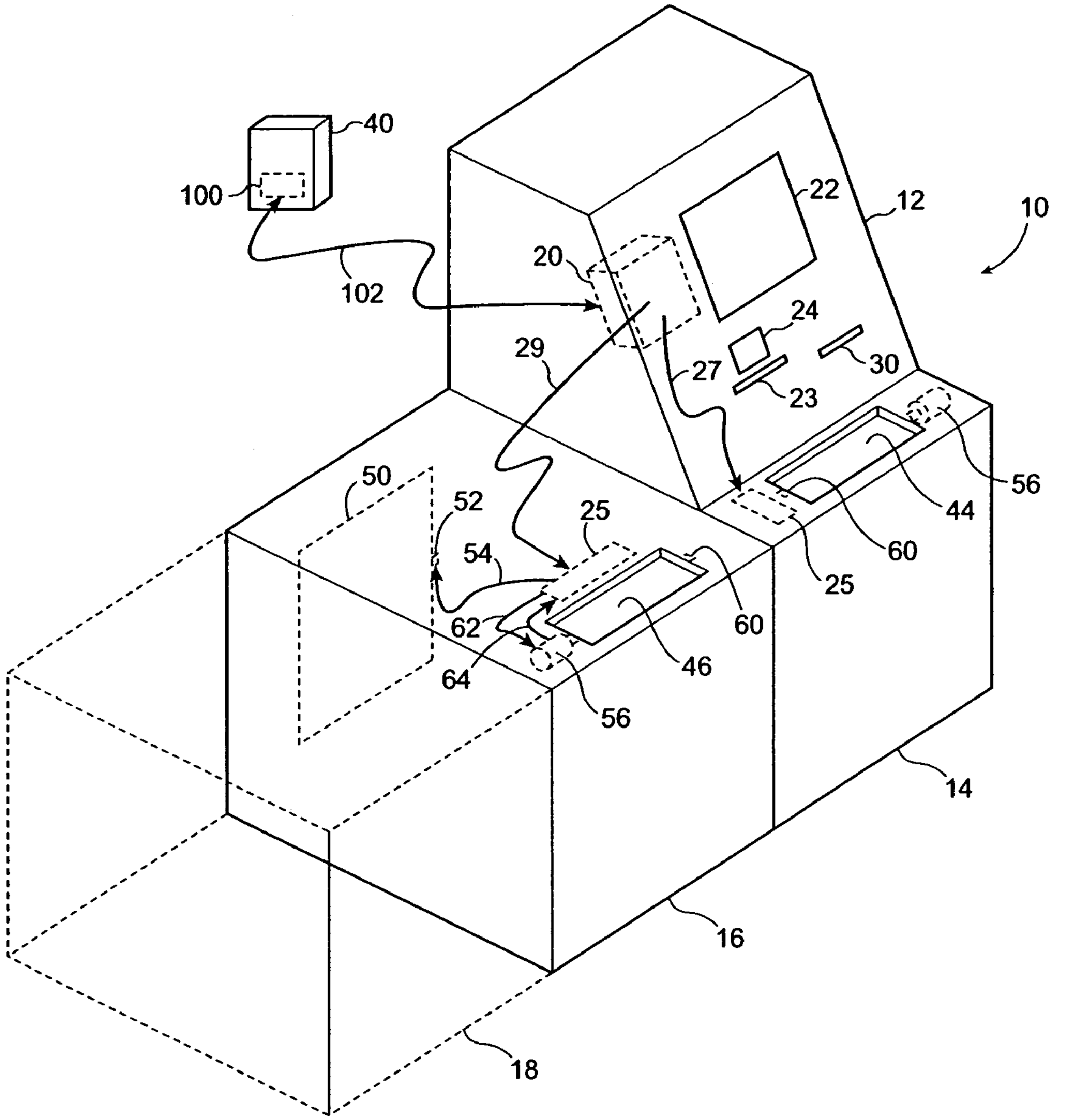
FIG. 1 is a front perspective view of the deposit taking system of the present invention.

FIG. 1 shows a depositing system 10 according to the present invention. Shown in FIG. 1 are three modules 12, 14 and 16 which are described in more detail below. A further module 18 is shown in dotted outline.

Module 12 is a user interface module which preferably includes a local processor 20 which is operatively connected to a touch screen 22 and a user identification means 24. The user identification means can be any form of conventional user identification such as a magnetic card reader, biometric information identifier or the like. A card reader slot is shown at 23. The touch screen 22 provides a means for the user, once identified, to input information into the deposit taking device. A print receipt slot 30 is also provided on the front of the module 12 for printing receipts or the like. A printer, not shown, would be located behind the slot in a known manner.

A user of the device will generally be initially issued a magnetically encoded card and a personal identification (PIN) number. The user begins the deposit by swiping the card through the user identification means 24, such as a card reader 23 and when the card is recognized as described further below, be prompted for a PIN number. The user then enters the PIN number by touching the designated characters displayed on the touch screen 22. Upon the PIN number being checked and accepted the device 10 enters into a deposit dialogue with the user. It can be appreciated that other measures than a magnetic card and pin number may also be used to identify the user, as long as an acceptable level of security is provided. For example, systems based on fingerprint or eye identification may also be used, particularly when those technologies become sufficiently advanced.

While the module 12 can be configured to be a stand alone system, it is preferred if the local processor 20 can communicate with a remote processor 40. The remote processor may include, for example, a centralized computer or network controller 100 having a network database, which connects in turn to a number of other local processors (not shown). Deposit acceptance decisions can be made either at the local processor level, or at the remote central computer level as suits the needs of the users and the operators of the system. Preapproval of a deposit can be made by the centralized computer or network controller 100 and communicated to the local processor or network to permit the deposit opening to be opened.

The local processor 20 acts as a primary controller or processor of the device 10. A software program running on the local processor 20 provides a user interface that controls interaction with the user. It can be appreciated that a person skilled in the art would be familiar with the various prompts, instructions, and procedures involved in designing software for accepting user deposits.

In addition, the local processor 20 is a primary or central controller of the various elements or peripherals of the device 10. For example, upon completion of a deposit the local processor 20 directs the printer to print a receipt, which is emitted through the print receipt slot 30 and torn off by the user. Other elements directly controlled by the local processor 20 include the card reader 24. The local processor 20 also handles communication with the safe modules preferably through modular control boxes 25 as explained below and with outside devices, as discussed in more detail below.

According to the present invention, it is preferred to provide a control box 25, which functions as a secondary controller to provide a convenient electrical interface to some of the elements of the device 10. Communication between the local processor 20 and control box 25 in the preferred embodiment is through a standard RS-232 interface protocol. Such communication is indicated schematically as 27, 29. The control box 25 is generally a dedicated electronic unit that may be constructed using electronic design principles well known to persons skilled in the art.

The control box 25 has the capability to receive electrical signals, for example, from sensors, to process that information using an on-board microprocessor, to activate various elements by sending an appropriate electrical signal, and to exchange instructions and information with the local processor 20. For example, the control box 25 can monitor sensors which trigger when activities occur with respect to the safe modules as set out in more detail below.

The local processor 20 is preferably a standard personal computer in a convenient touch screen embodiment running an industry standard operating system. In the preferred embodiment the Windows NT™ operating system is used, though it can be appreciated that other operating systems may also be used. As noted, the control box 25 has an on-board processor. Since this processor is not likely to be a personal computer, it is most likely to run from an operating system or program appropriate for internal control of such devices. Finally, it can be appreciated that there may be other embodiments of the device 10 in which the functions of the control box 25 are expanded or narrowed from those shown, or even where the control box 25 is not used, so that all control flows directly from the local processor.

Associated with the user interface module 12 are two safe modules 14 and 16. While the drawings depict two by way of example, with a third in dotted outline, it will be understood that the present invention comprehends that more than two could be provided. For example there may be circumstances as set out in more detail below where three or more are desired. Further while only one user interface module 12 is shown, more such user interface modules could also be provided.

Also, while the user interface module 12 is shown above the safe module 14 since each module is a separate unit, the modules can be configured in any convenient way. For example, the user module 12 could be located on either side, or in the middle of the two safe modules.

Figure 2:
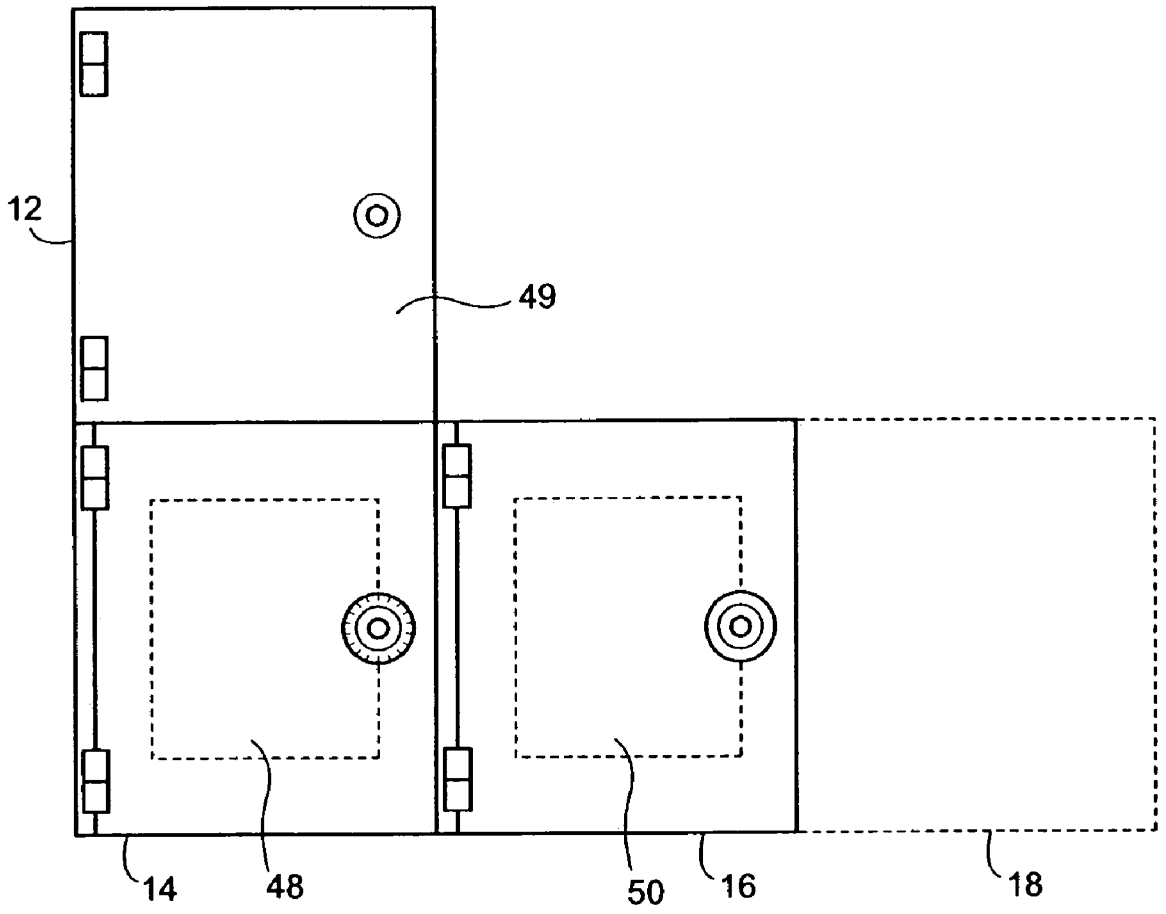
FIG. 2 is a rear view of the system of FIG. 1.

Referring to the safe modules 14,16 as shown, it will be noted that each safe module includes a processor controlled deposit opening shown respectively as 44 and 46. Most preferably each safe module 14 and 16 is configured to be a stand alone independent device which includes a safe door 48, 50, for access at the back as shown in FIG. 2. It will be appreciated that while rear doors are shown, front, side or other door locations are also comprehended by the present invention. All that is required is to locate a large enough door to permit the contents of the safe to be unloaded in an easy and efficient manner. A service access door 49 may also be provided for user interface module 12. Preferably all of the doors will be provided with sensors 52 to permit the opening and closing of the doors to be sensed, for security reasons. These door sensors may be tied to the controller 25, or directly to the local processor 20 as desired. A connection 54 to controller 25 is preferred. A drop sensor, to confirm the deposit is made, is also desirable.

Each of the processor controlled deposit openings 44, 46 will include a form of actuator 56, and appropriate sensors 60 to record the opening and the closing of the openings 44, 46. The openings may be closed by guillotine or sliding gates, which include an electronic, hydraulic or other actuators 56 to motivate them. The actuator can be directed either directly by the local processor 20 or more preferably through the controller 25 through links 62, 69. Essentially the present invention provides for each deposit opening to be instrumented to permit the system 10 to control both the opening and the closing of the deposit opening, as well as to record that these actions have been successfully completed. A solenoid lock pin or other safety measure can be used to prevent the gate from being openable during a loss of power of the like. Further, it is most preferred to include a typical anti-fishing configuration to the deposit opening access to the corresponding safe in the usual manner.

Another configuration for the deposit opening is to use drawers. Access through such drawers is also controlled, by the local processor, by releasing for example a locking pin to permit the drawer to open so a deposit to be made through the deposit opening. The present invention comprehends that any form of closure of the deposit opening can be used, including hinged, sliding or other mechanisms. Regardless of the mechanical structure, what is desired is to provide processor controlled opening of the deposit opening, to permit the customer access only to the appropriate safe module.

It will be appreciated that the controller 25 interfaces with a number of sensors and other elements associated within each safe module. In the preferred modular design of the present invention, a single controller is provided for each safe module, and is housed within the safe module. Thus, all of the connections required between the door sensors, deposit opening sensors, the actuator, and the like, and the controller 25 can be self contained within the module. In this manner all that is required to connect a safe module to a local processor, for example, in an associated user interface, is a single electrical or other communication connection. Thus, having a single electrical connection improves the modularity of the design, over having to connect a plurality of sensors and actuator controllers from each safe module into a local processor, with all the attendant connections. The present invention comprehends that the user interface module will have a plurality of parallel ports to permit two or more safe modules to be easily electrically connected therewith. To this end, the present invention comprehends in one embodiment providing the user interface with an external connection interface, to permit the safe modules to be plugged into the user interface modules and connected to the local processor.

According to the present invention, the processor controlled deposit openings 44 and 46 are selectively opened as part of the deposit taking process. In use, a user would approach the user interface module 12 and then be identified, for example, by means of a magnetic card reader. Once identified, the user would provide information relating to the deposit by inputting the deposit information into the local processor through the touch screen. The deposit taking system would then open an appropriate one of the processor controlled deposit openings according to predetermined preferred criteria of the deposit taking system. Thus, according to the present invention, a number of deposit taking safes may be associated with a single controller, where each safe corresponds to a different bank. Thus, at a common location, for example in a mall, a number of banks could have deposit taking safes connected to a single user interface module. Thus, upon identification of the bank customer, through the user interface module, a customer appropriate safe will be opened for receiving the customers deposit. In another embodiment, the deposit taking safes could be separated between cash and cheque deposits, for the purpose of pre-sorting such deposits at the point of deposit. In this event, the cash deposit safe may be made more secure than the cheque deposit safe as taught in our prior application 2,312,275. However, the improvement of the present invention is to have each safe self contained within its own module, so that each safe module may be built to a predetermined security standard.

It will be appreciated by those skilled in the art that any number of safe modules may be provided. It will also be appreciated that communication between the safe modules and the user identification system can be accomplished by any appropriate means, including wired or wireless solutions with adequate communication security. Further, while two safe modules are shown in the attached drawings, more or fewer modules could be included, where the safe modulars are built to the same or different security standards. Thus, the present invention provides an easily scalable deposit taking system to meet specific customer need and demand at any given location. As such, the present invention provides flexibility in application and reduces overhead expenses.

The modular design of the present invention can now be more fully appreciated. Each of the user interface and safe modules comprises a separate housing, which are intended to be in electronic communication, but not necessarily physical connected to one another. Thus, if at a given location there is a need for three safes, each having a processor controlled opening, then this can be readily provided. If at a later time there is a need to add more safe capacity at the same location, another safe module can be added and easily electronically connected to the system 10. Alternatively, if a different type of safe module is required, or more or less user interfaces are required, or even if the need for these change over time, then further modules can be added or removed as required. Thus, the present invention provides a modular design for a deposit taking system which permits flexibility of implementation and an ability to change the physical resources to match changes in customer demand.

In addition to the various internal elements of the device 10 described above, the present invention further includes a remote processor or network controller 100. The network controller 100 is a computer in active communication with device 10, or more particularly, with local processor 20 of device 10. Physically, the communication may be by any established communication means 102, such as telephone line, data line, or wireless ethernet. Preferably the network controller 100 runs on the same operating system as local processor 20, so that network communication is facilitated.

The network controller 100 fulfills functions relating to administration of client or depositor accounts and also relating to monitoring of device status. The administration related software of the network controller 100 maintains or has ready access to a database containing such financial and security material as customer identification, account balances, and authorized PIN numbers and magnetic card codes. Further, as will be discussed in greater detail, the network controller 100 is informed of and keeps track of deposit information at each device 10.

The monitoring function software of the network controller 100 receives and processes a stream of information from the device 10 relating to the status of device 10. This includes such information as whether the rear door of a given safe is open or closed, whether a processor controlled access slot is opened or closed, and whether any elements are malfunctioning. If there is a service problem, the network controller 100 may alert or dispatch the appropriate service personnel as soon as the problem is identified. Depending on the nature of the problem, the network controller may put device 10 out of service pending repair. Due to the modular nature of the present invention, any malfunctioning unit may also be more readily replaced than in the prior art combination units. Of course, in any installation of such modular units the units themselves must be securely and safety placed in position to frustrate theft of the same. This could involve, for example, securing means to fix the modules in place which securing means are not accessible to the public.

Physically, the network controller 100 can be a single computer at a particular location running both the administration and the monitoring software. However, since the administration software relates primarily to banking, and the monitoring software relates primarily to machine maintenance, in practice the network controller 100 may be conveniently divided into two separate systems running at two distinct locations. In that case, the administration software would typically run on a bank computer, and the monitoring software would run on a service or maintenance company computer. Both systems would be networked to the device 10.

Whether it is implemented as one computer or two, the network controller 100 is integral to the operation of the device 10 of the present invention. In general, it is preferable to keep system-wide and security related information such as PIN numbers separately from the local processor 20. The local processor 20 is accordingly designed to run the operation of the local device 10, and to pass on specific deposit information to the network controller 100, rather than to keep such information stored locally. This simplifies the design of the individual device 10, and enables the device operator to take a system approach. This is most practical since most users of the device 10 of the present invention will have more than one location accepting deposits, and will have a need to track a multiple number of devices 10. In the case where there is just one device 10, a separate PC at the same location as the device 10 may be used to fulfill the functions of the network controller 100.

The local processor 20 also receives local device status information, which it in turn communicates to the monitoring software of the network controller 100. The local processor 20 will also receive instructions in response from the network controller 100 relating to device status, such as for example an instruction to stop accepting new deposits.

The present invention also comprehends including a deposit tracking system an example of which is set out in our earlier patent application 2,312,275. As such, centralized control and tracking of deposits is made possible by the use of a unique identifier or electronic tag associated with a cannister for receiving the deposit. Thus, for example, FIG. 11 of our prior patent shows the network controller 100 networked to three canisters each having a unique identifier "#1", "#2" and "#3" respectively. The three devices may represent, for example, three separate safe modules disparately located in an urban area. When each of the canisters is first installed, the local processors informs the network controller that a canister having a particular electronic tag is installed. Accordingly, as shown the network controller 100 has in its storage or memory each of the unique identifiers, as well as related information such as store location. Subsequently when each canister is removed and transported, generally by armoured vehicle to a bank depository the network controller can track the canisters as long as communication channels are available with the vehicle and bank depository. The bank depository represents a secure location with financial or currency processing capability that is operated by a bank or financial institution where the owner of the deposited currency maintains an account. Thus, the present invention comprehends also tracking deposits through the deposit taking processing system, and in particular, recording when the deposits are moved from the safe. It will be further understood that by reason of the user providing deposit information, a virtual inventory is kept of the deposits. When the safe modules are unloaded, the virtual inventory can be printed, for example by the printer, and use to provide a physical manifest to accompany the safe contents during transportation. Rather than a physical manifest, the present invention also comprehends a virtual manifest being downloaded into an electronic chip or the like which accompanies the deposit. In either case, a record is made of the deposits being removed from the safe module.

As will be understood by those skilled in the art, many variations are possible to the above-noted design without departing from the broad spirit of the attached claims. Although some of these variations have been discussed above, others will be apparent to those skilled in the art. Specifically, the present invention comprehends a selectively openable modular deposit taking system which is easy to use and inexpensive to install and operate. The present invention provides a simple plug and play approach to increasing capacity through adding or subtracting modules, and permits the type of capacity to be added to suit the demand. By reason of the modular design and simple interconnection between modules, individual modular elements can be easily removed, or interchanged for periodic maintenance or repair.

The embodiments of the invention in which an exclusive property or privilege is claimed are defined as follows:

1. A deposit taking system for receiving deposits from one or more users, said deposit taking system comprising:

at least two safes each having at least one processor controlled deposit opening;

a local processor, operatively connected to each of said safes, said local processor having a user interface to communicate with the user, and being capable of communicating with a remote processor;

a means for opening a respective one of said processor controlled deposit openings in response to a communication from either said user or said remote processor; and a remote processor which can communicate with said local processor;

wherein, said user's deposits are sorted by said deposit taking system opening one or another of said deposit openings, and wherein said user must be approved before said deposit taking system opens a respective one of said processor controlled deposit openings, and wherein said local processor requests approval for said user from said remote processor, and said remote processor responds to said local processor with a communication of an approval or a rejection of said user, and wherein said remote processor evaluates said status information and responds to said local processor with a communication to cease accepting further deposits, and wherein said remote processor also communicates a request to a service provider to provide service to said deposit taking system, and wherein said means for opening a respective one of said processor controlled deposit openings opens one of said processor controlled deposit openings in the event the user is identified as a customer of one financial institution and another of said processor controlled deposit openings in the event the user is identified as the user is a customer of another financial institution.

2. The deposit taking system according to claim 1, wherein each of said safes are contained in a separate module to permit flexibility in placing said modules in accordance with user demand.

3. The deposit taking system as claimed in claim 1, further including a separate access opening for each safe to permit the contents of the safe to be periodically removed.

4. The deposit taking system according to claim 2, wherein said means for opening a respective one of said processor controlled deposit openings opens a respective one of said processor controlled deposit openings in response to a user identification.

5. The deposit taking system according to claim 1, wherein status information relating to said deposit taking system is provided to said local processor, which in turn communicates said status information to said remote processor.

6. The deposit taking system according to claim 1, wherein said means for opening a respective one of said processor controlled deposit openings opens a respective one of said processor controlled deposit openings in response to the type of deposit being made by a user.

7. The deposit taking system according to claim 1 wherein said means for opening a respective one of said processor controlled deposit openings opens one of said processor controlled deposit openings where the deposit is a cash deposit and another of said processor controlled deposit openings where the deposit is a deposit other than a cash deposit.

8. The deposit taking system according to claim 1, wherein said user interface includes a computer touch screen.

9. A method of receiving a deposit from a user, said method comprising:

providing a receiving device, comprising at least two safes, a local processor operatively connected to each of said safes, said local processor having a user interface to communicate with the user, each of said safes farther including at least a processor controlled deposit opening;

receiving from said user deposit information through said user interface; and opening one of said processor controlled deposit openings to permit the user to place a deposit therein, wherein said user, by placing said deposit in said open processor controlled deposit opening, sorts said deposit and wherein the opening of the one of said processor controlled deposit openings opens one of said processor controlled deposit openings in the event the user is identified as a customer of one financial institution and another of said processor controlled deposit openings in the event the user is identified as the user is a customer of another financial institution.

10. A method of receiving a deposit of currency from a user according to claim 8, said method farther including the steps of: providing a remote processor at a remote location, said remote processor being capable of communicating with said local processor of said receiving device; and communicating said deposit information to said remote processor when said deposit is made by said user.

11. A method of receiving a deposit of currency from a user according to claim 9, said method further including the step of communicating preapproval to said local processor to permit said deposit opening to be opened.

* * * * *